C. E. RICHEFEU.
PLOW.
APPLICATION FILED MAY 21, 1918.
1,279,588.
Patented Sept. 24, 1918.
2 SHEETS—SHEET 1.
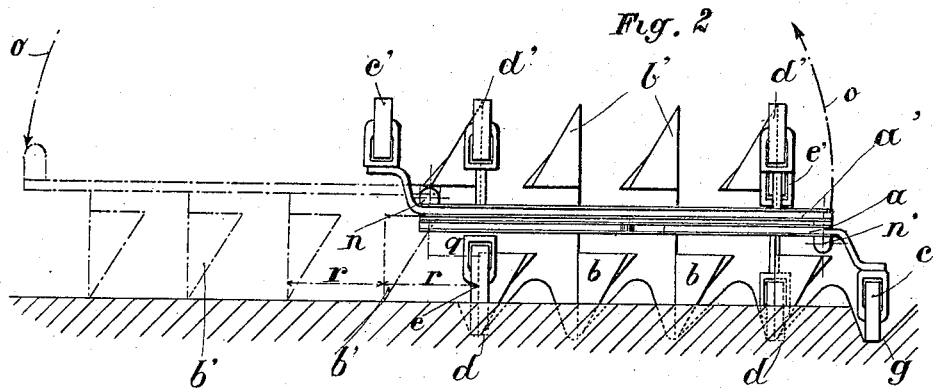
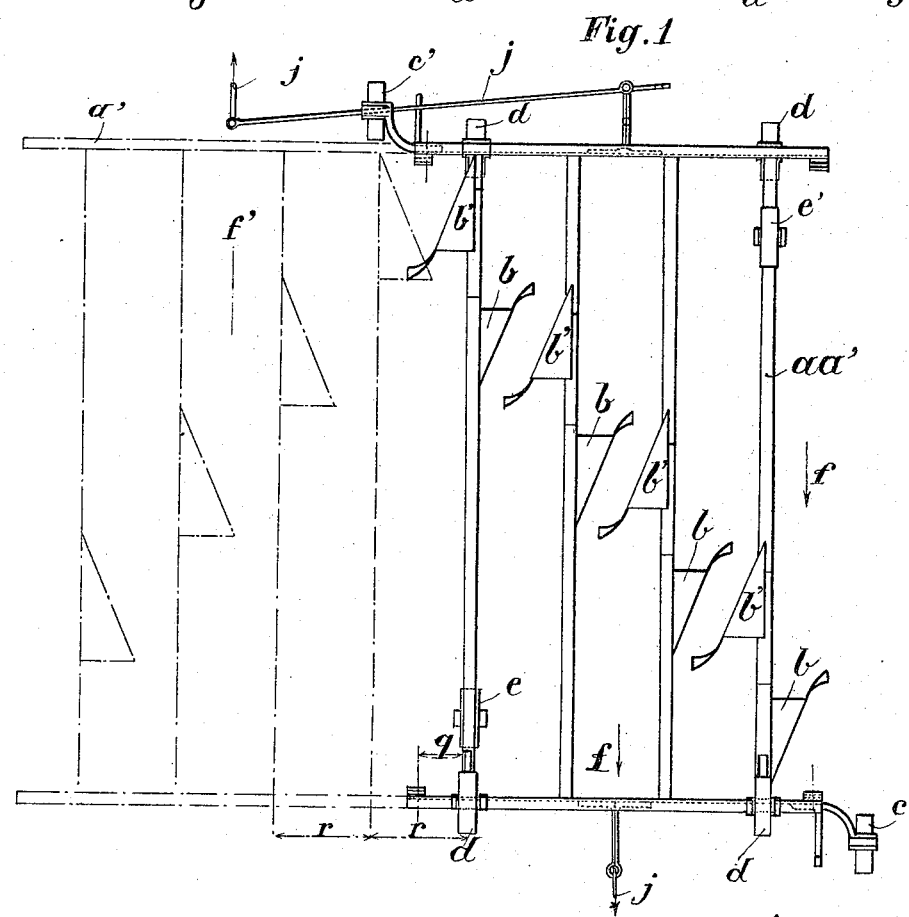
Inventor
Charles Edouard Richefeu
by Ottmunn
his Attorney

C. E. RICHEFEU.
PLOW.
APPLICATION FILED MAY 21, 1918.

1,279,588.

Patented Sept. 24, 1918.
2 SHEETS—SHEET 2.

Inventor
Charles Edouard Richefeu
by his Attorney

UNITED STATES PATENT OFFICE.

CHARLES EDOUARD RICHEFEU, OF LOUERRE, PAR GENNES, FRANCE.

PLOW.

1,279,588.　　　　　　　　　Specification of Letters Patent.　　Patented Sept. 24, 1918.

Application filed May 21, 1918.　Serial No. 235,789.

*To all whom it may concern:*

Be it known that I, CHARLES EDOUARD RICHEFEU, citizen of the Republic of France, residing at Louerre, par Gennes, Maine and Loire, in the Republic of France, have invented new and useful Improvements in Plows, of which the following is a specification.

This invention relates to a plow which allows when the end of the field to be tilled has been reached to make furrows in the reverse direction without having to turn the plow.

The improved plow consists essentially of two frames arranged one upon the other, which are each provided with supporting wheels and shares and work in turn according to whether the plow is running in one direction or in the opposite direction. When the machine has reached one end of the field to be tilled, and if it is desired to come back in the reverse direction, the upper frame is swung through an angle of 180° with respect to the lower frame, about laterally arranged hinges and is thereby brought to a working position on the part of the ground which has not yet been plowed and the lower frame, which has just finished its working travel is then folded down over the other frame which is about to begin to work, by a swinging movement of 180° about the same hinges.

The two frames are in fact connected together along each of their longitudinal edges by a system of joints or hinges forming a pivotal and detachable connection. When the end of the field is reached, one of the two systems is freed so as to permit the upper frame to pivot or swing with respect to the other about the hinges located at the other side.

The hinges or articulations must be so arranged that the frame which is about to work may be on a higher level than the frame which has just finished its working stroke, prior to the folding down of the latter over the first frame, since the frame which is to begin to work rests on the untilled part of the ground while the other frame has its support at the bottom of the furrows. The difference in the levels of both frames may be made adjustable according to the depth of the furrows.

The plow may be drawn by two windlasses carried on locomobiles which move at both ends of the field in directions at right angles with the furrows.

In the annexed drawing given by way of example:

Figure 1 is a diagrammatic plan view of the improved plow, showing at the left in chain and dot lines the position of the upper frame when the same has been folded down upon the ground for working in the reverse direction.

Fig. 2 is a front view of the plow, the position of the upper frame when tilted down upon the ground being also shown at the left in broken lines.

Fig. 7 is a diagrammatic plan view showing the general arrangement for plowing.

Figure 4:
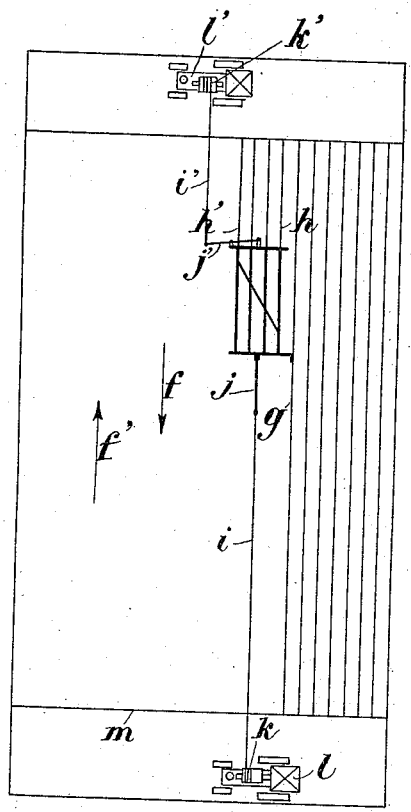
Fig. 4 is a side view of the rear part of the plow.
Figure 3:
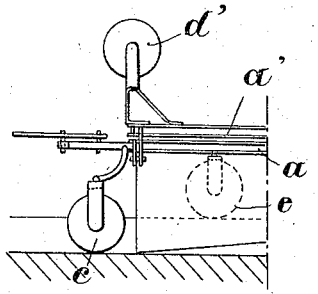
Fig. 3 is a side view of the front part of the plow.
Figure 4:
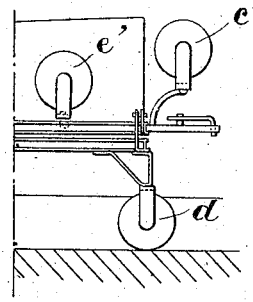

As shown in the drawing, the improved plow may be considered as formed of two superimposed plows which work in turn, one in the direction of the arrow $f$ and the other in the direction shown by the arrow $f^1$. Each of the plows comprises a frame, $a$ or $a^1$, provided with shares, $b$ or $b^1$, and carried on a front steering or guiding wheel $c$ or $c^1$ which runs in the nearest of the furrows made in the last working stroke, a front ground wheel $e$ or $e^1$ which runs upon the untilled soil and consequently lies on a higher level than the furrow wheel $c$, $c^1$ and two rear supporting wheels $d$ or $d^1$ which respectively follow those of the furrows which have just been made which are located at both sides.

In the position of parts shown in full lines, the shares $b$ alone are at work, the plow is drawn in the direction of the arrow $f$ by means of a cable $i$ connected to the front draw bar $j$ of the plow and wound on a windlass $k$ carried on a locomobile $l$, which latter can move in a direction at right angles to the direction of the furrows and be brought to such a position that the traction always takes place along the longitudinal central line of the plow.

Figure 5:
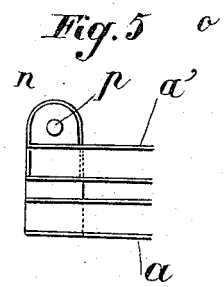
Figs. 5 and 6 show details of the hinged joints.
Figure 6:

When the plow has approximately come to the border line $m$ (Fig. 7) of the field to be tilled, and if it is desired to begin a new stroke in the reverse direction shown by arrow $f^1$ the upper plow frame $a^1$ is turned through 180° about the hinged joints $n$ (Fig. 2) as shown by the arrow $o$ so that it comes to the position shown in broken lines in Figs. 1 and 2. The hinges $n$ occupy such a position that the frame $a^1$ when folded down upon an untilled part of the ground, may stand on a higher lever than that of the frame $a$ which rests upon the bottom parts of the furrows. To compensate for varying depths of furrows, the vertical distance between the two frames in that position may be made adjustable by providing in the hinges a number of holes such as $p$ (Figs. 5 and 6) at different heights said holes receiving the spindles or pivots of the joints.

When the plow frame $a^1$ has thus been brought down upon the ground, the frame $a$ itself is swung by 180° about the hinged joints $n$, in the direction shown by arrow $o$ so as to come over the frame $a^1$. The plow is then drawn along the field in the direction shown by the arrow $f^1$ by the windlass $k^1$ provided on the locomobile $l^1$ the cable $i^1$ being then connected to the draw bar $j^1$ which at that time extends in the central longitudinal plane of the machine. The horizontal transversal distance $q$ (Figs. 1 and 2) between the hinge axis and the line of travel of the nearest plow share $b$ or $b^1$ is equal to half the distance $r$ between two adjacent furrows so that the right hand furrow dug out in the direction $f^1$ will be at the normal distance $r$ from the right hand furrow made in the previous stroke.

When the plow has thus been laterally turned upside down as described, the hinges $n^1$ are on the left side of the machine (Fig. 2) and to make a further stroke in the direction of arrow $f$ the plow frames will have to be tilted over about said hinges. Of course it will then be necessary to effect this, to disconnect both frames from each other at the hinges $n$ in the same manner as it had been necessary to disconnect the same from each other at the hinges $n^1$ in order to effect the tilting operation above described. To permit of thus disconnecting the frames from each other alternatively at one side and the other, the hinges $n$, $n^1$ will be provided with movable pivots or studs and means may be provided whereby said studs will engage automatically into the corresponding holes or bearings when one frame is swung down upon the other all of the studs or pivots being engaged in the corresponding bearings at both sides of the machine when the latter is in operation so that both frames are securely held together.

The draw bars $j$, $j^1$ may be dispensed with. When they are provided, they preferably have a length equal to the width of the plow. While the machine is working in the direction of arrow $f$ and trailed through the draw bar $j$, the draw bar $j^1$ may be swung laterally as shown in Figs. 1 and 7 so that the cable $i^1$ may be immediately in a proper position for effecting the traction in the next stroke, the locomobile $l^1$ being meanwhile advanced transversely by a suitable distance. The same will of course be done for the draw bar $j$ when the machine is running in the direction $f^1$. The front furrow wheel $c$ is so mounted as to be vertically adjustable whereby it may be raised to a higher position when plowing is started, said wheel running then on an untilled ground.

The front ground wheel $e$ is mounted in a yoke which may swing around a vertical axis so that the wheel may easily run out of eventual wheel tracks and have no influence on the steering of the plow.

The plow shares may be provided in any convenient number and the construction shown and described may be varied in many respects without departing from the spirit of the invention and the scope of the appended claims.

Having now described my invention, what I claim as new and desire to secure by Letters Patent is:

1. A plow comprising in combination two normally superimposed frames, plow shares and supporting wheels on each of said frames, the shares and wheels on one frame being adapted for use when the plow is running in one direction and the shares and wheels on the other frame being adapted for use when the plow is running in the opposite direction and connecting means adapted to pivotally and detachably connect both frames to each other, along two lateral opposite edges of the same.

2. A plow comprising in combination two normally superimposed frames, plow shares and supporting wheels on each of said frames, the shares and wheels on one frame being adapted for use when the plow is running in one direction and the shares and wheels on the other frame being adapted for use when the plow is running in the opposite direction and connecting means adapted to pivotally and detachably connect both frames to each other along two lateral opposite edges of the same, the articulation axis of the hinges at each side of the frames being transversally and horizontally at a distance from the line of travel of the nearest plow share equal to half the cross horizontal distance between two adjacent shares on the same frame.

3. A plow comprising in combination two normally superimposed frames, plow shares and supporting wheels on each of said frames, the shares and wheels on one frame being adapted for use when the plow is running in one direction and the shares and wheels on the other frame being adapted for use, when the plow is running in the opposite direction and connecting means adapted to pivotally and detachably connect both frames to each other along two lateral opposite edges of the same, the articulation axis of the connecting means at one side of the frames being above, and at the other side, below the level of the frames.

4. A plow comprising in combination two normally superimposed frames, plow shares and supporting wheels on each of said frames, the shares and wheels on one frame being adapted for use when the plow is running in one direction and the shares and wheels on the other frame being adapted for use when the plow is running in the opposite direction and connecting means adapted to pivotally and detachably connect both frames to each other along two lateral opposite edges of the same, the articulation axis of the connecting means at one side of the frames being above, and at the other side, below the level of the frames, and means whereby the vertical distance between the articulation axis of the connecting means and the level of the frames may be adjusted.

5. A plow comprising in combination two normally superimposed frames, plow shares and supporting wheels on each of said frames, the shares and wheels on one frame being adapted for use when the plow is running in one direction and the shares and wheels on the other frame being adapted for use when the plow is running in the opposite direction, means adapted to pivotally and detachably connect both frames to each other along two lateral opposite edges of the same, a draw bar connected to each of the frames at a point in the middle of the width of said frames and having a length equal to said width and means on the frames for holding said draw bars in a substantially horizontal transversal position.

In testimony whereof I have signed my name to this specification in the presence of two subscribing witnesses.

CHARLES EDOUARD RICHEFEU.

Witnesses:
V. GARAULT,
CHARLES W. BRACKETT.

Copies of this patent may be obtained for five cents each, by addressing the "Commissioner of Patents, Washington, D. C."